United States Patent Office 3,260,575
Patented July 12, 1966

3,260,575
SINGLE-STEP PROCESS FOR PREPARATION OF URANIUM DIOXIDE FROM URANIUM HEXAFLUORIDE
Richard L. Heestand and Carl F. Leitten, Jr., Oak Ridge, Tenn., assignors to the United States of America as represented by the United States Atomic Energy Commission
No Drawing. Filed Nov. 19, 1964, Ser. No. 412,572
10 Claims. (Cl. 23—355)

This invention relates to fuel materials for nuclear reactors and more particularly to a process for preparing uranium dioxide from uranium hexafluoride.

Uranium dioxide is widely used as a fuel material for nuclear reactors. The excellent physical and chemical stability of $UO_2$ at elevated temperatures, along with its favorable nuclear characteristics and resistance to irradiation, allow its use in numerous types of fuel elements. For example, $UO_2$ may be employed in the form of dense sintered compacts, the spherical particles dispersed in a non-fissionable matrix or as vibratorily compacted particles.

The preparation of $UO_2$ for fuel-element use has required a series of chemical processing operations. In a typical processing sequence sinterable $UO_2$ powder is prepared from isotopically enriched $UF_6$, the product of uranium isotope separation by the gaseous diffusion process, as follows: the $UF_6$ is reacted with water to produce an aqueous uranyl fluoride solution. The uranium is then precipitated by addition of ammonia, and the precipitate is filtered and converted to $U_3O_8$ by heating. The $U_3O_8$ is in turn reduced to $UO_2$ with hydrogen at elevated temperatures. Additional processing has been required to obtain the $UO_2$ in other useful forms such as dense fragments suitable for vibratory compaction. It may be readily seen that substantial savings in fuel costs could be realized by providing a simple, one-step process for conversion of $UF_6$ to $UO_2$.

$UO_2$ has been prepared by reacting $UF_6$ with water vapor and hydrogen, but the product has not been suitable for fuel-element use without further treatment. For example, $UF_6$ has been contacted with water vapor and hydrogen in a fluidized bed of $UO_2$ particles at temperatures of 600 to 700° C. and atmospheric pressure, the $UO_2$ formed thereby being coated on the fluidized particles. The fluorine content of the $UO_2$ produced by this method has been excessively high, normally over 250 parts per million, and less than 100 parts per million is required for most fuel element applications. The necessity of maintaining a fluidized bed of $UO_2$ particles is a further disadvantage in this process since the physical form of the product is thereby limited to fluidizable particles, typically 50 to 800 microns in diameter.

It is desired to produce $UO_2$ in the form of sub-micron size sinterable powder without employing a fluidized bed or other particle-seeding means. Other desired forms of the $UO_2$ are a continuous solid deposit of predetermined dimensions and a dense, irregular crystalline deposit suitable for fabrication by vibratory compaction.

It is, therefore, an object of this invention to provide a single-step process for preparation of $UO_2$ from $UF_6$.

Another object is to provide a process for preparing $UO_2$ having a low fluorine impurity content from $UF_6$.

Another object is to provide a process for preparing said $UO_2$ in the form of sinterable powder.

Another object is to provide a process for preparing said $UO_2$ in form of a dense crystalline deposit.

Another object is to provide a process for preparing said $UO_2$ in the form of a continuous solid deposit of predetermined dimensions.

Other objects and advantages of this invention will be apparent from the following detailed description and claims.

In accordance with the present invention $UO_2$ is prepared by contacting $UF_6$ with a stoichiometric excess of a gaseous mixture comprising hydrogen and water vapor or hydrogen and oxygen at a temperature above 1100° C. and a pressure less than 20 torr. By varying the reaction conditions and the method of mixing the reactant gases, the $UO_2$ may be obtained as a fine, sinterable powder, as a continuous solid deposit or as a dense, irregularly shaped crystalline deposit. The fluorine content of the product is sufficiently low for fuel-element use.

The reaction of $UF_6$ with hydrogen and water vapor is thought to proceed by one or more of the following mechanisms:

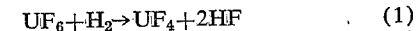
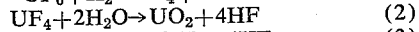
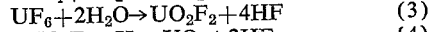
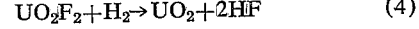

$$UF_6 + H_2 \rightarrow UF_4 + 2HF \quad (1)$$
$$UF_4 + 2H_2O \rightarrow UO_2 + 4HF \quad (2)$$
$$UF_6 + 2H_2O \rightarrow UO_2F_2 + 4HF \quad (3)$$
$$UO_2F_2 + H_2 \rightarrow UO_2 + 2HF \quad (4)$$

The overall reaction, which is the sum of equations (1) and (2) or (3) and (4), may be represented as follows:

$$UF_6 + 2H_2O + H_2 \rightarrow UO_2 + 6HF \quad (5)$$

Oxygen may be used instead of water vapor in the present process, in which case the overall reaction is depicted as follows:

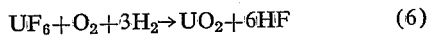

$$UF_6 + O_2 + 3H_2 \rightarrow UO_2 + 6HF \quad (6)$$

Control of temperature and pressure are critical to producing a substantially fluorine-free product in the present process. A temperature of at least 1100° C. is required to avoid formation of $UF_4$. A temperature in the range of 1200 to 1500° C. is preferred. Higher temperatures may be employed, but no further process improvement is obtained and the maximum operating temperature for most available equipment would be exceeded. A pressure less than 20 torr is critical since fluoride intermediates are produced along with the $UO_2$ at higher pressures.

Stoichiometric excesses of both hydrogen and water vapor or oxygen are required in the present process. In accordance with Equations 5 and 6, above, in excess of two moles water vapor and one mole hydrogen per mole $UF_6$ are required where water-vapor is employed and one mole oxygen and three moles hydrogen per mole $UF_6$ are required where oxygen is employed. It is to be understood that the water vapor and oxygen embodiments are equivalent and interchangeable in the present process. Oxygen is preferred, however, since it is more easily handled and metered than water vapor. The amount of excess of these reactants is not critical to the formation of $UO_2$, but at $UF_6$ concentrations over 10 mole percent in the reactant gas mixture a portion of the uranium may pass through the system in gaseous form. The amounts of excess hydrogen and water vapor or oxygen are further adjusted, depending on the product desired, as discussed below.

The physical form of the product may be controlled by varying the method of contacting the reactant gases, the proportions of excess hydrogen and water vapor or oxygen and the pressure. Sinterable powder consisting of extremely fine particles about 60 to 200 angstroms in diameter is obtained in one embodiment of the present invention by premixing the $UF_6$ and the other reactant gases at a temperature of 800 to 1000° C., and preferably 900 to 1000° C., prior to contacting the gases in a higher temperature zone for formation of $UO_2$. Fine solid particles, probably uranyl fluoride, are formed in the premixing step and converted to $UO_2$ in the high temperature zone. For this embodiment the $UF_6$ is contacted with a gas mixture containing at least 1.5, and preferably 8 to 10, times the stoichiometric amount of water vapor or oxygen and at least 4, and preferably 15 to 20, times the stoichiometric amount of hydrogen. Although any pressure below 20 torr may be employed, a pressure of about 10 torr is preferred. The required combination of reaction conditions may be obtained through the use of an elongated refractory tube as the reaction vessel with one end region heated to 900 to 1000° C., and the rest heated to 1200 to 1500° C. The $UF_6$ and the other reactant gases are introduced separately into the 900 to 1000° C. end and the resulting mixture is passed through the high temperature region. Formation of $UO_2$ occurs rapidly, and essentially complete conversion is obtained by single passage through a reaction chamber 20 inches long.

The $UO_2$ is obtained in the form of a solid deposit by maintaining the pressure below 10 torr and avoiding premixing of the $UF_6$ with the other reactant gases. For formation of a solid deposit the $UF_6$ and the other reactant gases are therefore introduced separately into the high-temperature zone, preferably at a temperature of 1200 to 1500° C. A refractory surface is provided within or surrounding the high-temperature zone for deposition of the $UO_2$. Low-density alumina is suitable for this purpose.

The physical form of the solid deposit is determined by the amounts of excess hydrogen and water vapor or oxygen. At relatively low excess amounts of these reactants, the $UO_2$ is deposited as a smooth, continuous layer, and at high excess amounts a dense, needle-like crystalline growth is obtained. It is believed that the lower concentration of $UF_6$ and the resulting lower rate of deposition at high excess amounts allow the $UO_2$ to seek out low-energy faces of the solid for preferential buildup of crystals. Intermediate excess amounts result in a partially crystalline deposit.

For preparation of a smooth, continuous solid deposit the following proportions of reactant gases are preferred: water vapor or oxygen, about 1.4 to 10 times the stoichiometric amount and hydrogen, about 5 to 20 times stoichiometric. In this embodiment the dimensions of the refractory surface are adjusted to provide the desired dimensions in the deposited solid. For example, the $UO_2$ may be deposited as a tubular structure by employing a tubular refractory vessel as the reaction chamber and allowing the $UO_2$ to build up to the desired thickness. The tubular $UO_2$ body, after applying a suitable cladding layer inside and outside, is useful as a fuel element.

For preparation of a crystalline deposit the preferred reactant ratios are as follows: water vapor or oxygen, about 10 to 90 times the stoichiometric amount and hydrogen, about 30 to 90 times stoichiometric. Under these conditions the $UO_2$ deposits as a high-density, needle-like growth which may be readily crushed to provide particles suitable for fabrication into fuel elements by vibratory compaction. The partially crystalline deposit produced at intermediate reactant ratios may also be crushed to produce particles for this purpose.

The process of our invention is not limited to a particular apparatus. It is preferred to use a tubular vessel constructed of alumina or other ceramic material resistant to the reactant gases and by-product HF. For example, the reaction vessel may comprise a low-density alumina mandrell surrounded by a high-density alumina containment tube. In order to avoid buildup of a solid deposit at the gas inlet by premature reaction of the influent gases, it is preferred to use a concentric tubular nozzle for introducing the gases and to separate the $UF_6$ from the other gases as they leave the nozzle by means of an inert gas stream. In one suitable arrangement the $UF_6$ is introduced through a central tube, an inert gas stream is introduced through a surrounding tube, and the hydrogen and oxygen or water vapor are introduced through the annulus remaining between the surrounding tube and the tubular reactor vessel wall. The required low pressure is maintained by means of a conventional mechanical vacuum pump.

Recovery of the product $UO_2$ is achieved in the case of sinterable power by separation from the effluent gas. Deposited solid $UO_2$ may be recovered by mechanical removal of the refractory surface.

Our invention is further illustrated by the following examples.

Example I $UF_6$ was reacted with water vapor and hydrogen at a temperature of 1300° C. in an alumina tube 20 inches long and 1½ inches in diameter inserted in an electrically heated furnace. An inlet nozzle was provided at one end of the reaction tube with a concentric tubular feed to permit admission of an inert gas buffer for prevention of premixing of reactant gases. Effluent gases were removed from the other end of the reaction tube by connection with a vacuum system. $UF_6$, 16 times the stoichiometric amount of hydrogen and 1.4 times the stoichiometric amount of water vapor and the inert gas buffer were passed through the reactor at a pressure of 6 torr. $UO_2$ was deposited on the inner surface of the reaction tube at a rate of 30 mils per hour. After six hours operation the product, in the form of a smooth, tubular structure, was recovered. The product was identified as $UO_2$ by X-ray diffraction, and the chemical composition was found to be $UO_{2.048}$. Fluorine content of the product was approximately 50 weight parts per million.

Example II $UF_6$ was reacted with oxygen and hydrogen by the procedure of Example I except that the reactant gas mixture comprised oxygen at a proportion of 7.8 times the stoichiometric amount and hydrogen at 10 times the stoichiometric amount. After six hours operation the product, a tubular deposit having essentially the same properties as the product in Example I, was recovered.

Example III $UF_6$ was reacted with a gaseous mixture comprising 9.5 times the stoichiometric amount of water vapor and 30 times the stoichiometric amount of hydrogen in the apparatus of Example I. The reaction temperature was 1250° C. and the pressure 6 torr. The product was dendritic crystalline material of the composition $UO_{2.00}$, as determined polarographically. The weight composition was 87.47 weight percent uranium, 11.22 weight percent oxygen and less than 10 weight parts per million fluorine.

Example IV $UF_6$ was reacted with water vapor and hydrogen in the apparatus of Example I. The inlet end of the reaction tube was heated to 900° C. and the remainder to 1250° C. The composition of the reactant gas mixture was $UF_6$, 9 times the stoichiometric amount of water vapor and 20 times the stoichiometric amount of hydrogen. Finely divided $UO_2$ powder was formed upon passage of the gas mixture through the reaction tube. The average particle size of the $UO_2$ was 60 to 200 angstroms and the oxygen-to-uranium ratio was 2.04. The residual fluorine content was less than 40 weight parts per million. X-ray analysis indicated that the powder was $UO_2$.

The above examples are merely illustrative and are not to be understood as limiting the scope of our invention, which is limited only as indicated by the appended claims.

Having thus described our invention, we claim:

1. The method of converting $UF_6$ to $UO_2$ which comprises contacting said $UF_6$ with a stoichiometric excess of a gaseous mixture comprising hydrogen and an oxygen-bearing gas selected from the group consisting of gaseous oxygen and water vapor at a temperature above 1100° C. and a pressure not exceeding 20 torr.

2. The method of preparing sinterable $UO_2$ powder which comprises introducing gaseous $UF_6$ and a gaseous mixture comprising hydrogen at a proportion at least 4 times stoichiometric and an oxygen bearing gas selected from the group consisting of oxygen and water vapor at a proportion of at least 1.5 times stoichiometric into a mixing zone at a temperature of 800° C. to 1000° C. and a pressure less than 20 torr whereby solid particles are formed in the resulting mixture, passing the resulting particle-containing mixture through a reaction zone maintained at a temperature of at least 1100° C. and a pressure less than 200 torr, whereby said particles are converted to $UO_2$ and recovering the resulting $UO_2$ powder.

3. The method of claim 2 wherein said mixing zone temperature is from 900° C. to 1000° C.

4. The method of claim 2 wherein said reaction zone temperature is from 1200° C. to 1500° C.

5. The method of claim 2 wherein the proportion of hydrogen is 15 to 20 times the stoichiometric amount and the proportion of said oxygen-bearing gas is 8 to 10 times the stoichiometric amount.

6. The method of preparing a $UO_2$ solid deposit which comprises introducing $UF_6$ and a gaseous mixture comprising hydrogen at an excess of at least 5 times stoichiometric and an oxygen-bearing gas selected from the group consisting of oxygen and water vapor at an excess of at least 1.5 times stoichiometric into a reaction zone in contact with a refractory surface, the temperature of said reaction zone being at least 1100° C. and the pressure less than 10 torr, whereby $UO_2$ is deposited on said surface and recovering the resulting deposit.

7. The method of claim 6 wherein said temperature is from 1200° C. to 1500° C.

8. The method of preparing a smooth-surfaced $UO_2$ body which comprises introducing $UF_6$ and a gaseous mixture comprising hydrogen at an excess of about 5 to 20 times stoichiometric and an oxygen-bearing gas selected from the group consisting of oxygen and water vapor at an excess of about 1.5 to 10 times stoichiometric into a reaction zone in contact with a refractory surface, the temperature of said zone being from about 1200° C. to 1500° C. and the pressure less than 10 torr, whereby a solid $UO_2$ body is deposited on said surface and recovering said body.

9. The method of preparing a tubular $UO_2$ body which comprises introducing $UF_6$ and a gaseous mixture comprising hydrogen at an excess of about 5 to 20 times stoichiometric and an oxygen-bearing gas selected from the group consisting of oxygen and water vapor at an excess of about 1.5 to 10 times stoichiometric into a tubular vessel having a refractory inner surface, the temperature of the zone encompassed by said vessel being from about 1200° C. to 1500° C. and the pressure less than 10 torr, whereby $UO_2$ is deposited on said inner surface and recovering the resulting tubular deposit.

10. The method of preparing crystalline $UO_2$ which comprises introducing $UF_6$ and a gaseous mixture comprising hydrogen at an excess of about 30 to 90 times stoichiometric and an oxygen-bearing gas selected from the group consisting of water vapor and oxygen at an excess of about 10 to 90 times stoichiometric into a reaction zone in contact with a refractory solid surface, the temperature of said zone being from 1200° C. to 1500° C. and the pressure less than 10 torr, whereby crystalline $UO_2$ is deposited on said surface and recovering said crystalline $UO_2$.

References Cited by the Examiner

UNITED STATES PATENTS

| | | | |
|---|---|---|---|
| 3,160,471 | 12/1964 | Knudsen et al. | 23—14.5 |
| 3,168,369 | 2/1965 | Reese et al. | 23—14.5 |
| 3,179,491 | 4/1965 | Ukaji et al. | 23—14.5 |

OTHER REFERENCES

A.E.C. Documental, ANL-6606, February 1963, page 5.

LEON D. ROSDOL, *Primary Examiner.*

M. J. SCOLNICK, *Assistant Examiner.*